United States Patent
Keller

(10) Patent No.: US 6,169,834 B1
(45) Date of Patent: Jan. 2, 2001

(54) SLOTTED COMPOSITE CABLE HAVING A CABLE HOUSING WITH A TUBULAR OPENING FOR COPPER PAIRS AND A SLOT FOR AN OPTICAL FIBER

(75) Inventor: David A. Keller, Apex, NC (US)

(73) Assignee: Alcatel, Paris (FR)

(*) Notice: Under 35 U.S.C. 154(b), the term of this patent shall be extended for 0 days.

(21) Appl. No.: 09/078,143

(22) Filed: May 13, 1998

(51) Int. Cl.$^7$ ........................................ G02B 6/44
(52) U.S. Cl. ........................ 385/101; 385/105; 385/110
(58) Field of Search .................... 385/101, 100, 385/105, 110; 174/70 R

(56) References Cited

U.S. PATENT DOCUMENTS

| | | |
|---|---|---|
| Re. 34,516 | 1/1994 | Houghton . |
| 3,887,265 * | 6/1975 | Margolis et al. ............ 385/114 |
| 4,038,489 | 7/1977 | Stenson et al. . |
| 4,110,001 | 8/1978 | Olszewski et al. . |
| 4,155,963 | 5/1979 | de Vecchis et al. . |
| 4,354,732 | 10/1982 | Arnaud et al. . |
| 4,388,800 | 6/1983 | Trezeguet et al. . |
| 4,389,088 | 6/1983 | Trezequet . |
| 4,401,366 | 8/1983 | Hope . |
| 4,422,889 | 12/1983 | Trezeguet et al. . |
| 4,456,331 | 6/1984 | Whitehead et al. . |
| 4,474,426 | 10/1984 | Yataki . |
| 4,491,386 * | 1/1985 | Negishi et al. ............ 385/109 |
| 4,514,058 | 4/1985 | Walton . |
| 4,579,420 * | 4/1986 | Winter et al. ............ 385/113 |
| 4,596,443 | 6/1986 | Diemeer et al. . |
| 4,645,628 | 2/1987 | Gill . |
| 4,661,406 | 4/1987 | Gruhn et al. . |
| 4,690,498 | 9/1987 | Priaroggia . |
| 4,703,998 | 11/1987 | Uchioke et al. . |
| 4,707,074 | 11/1987 | Heywood . |
| 4,711,523 | 12/1987 | Iri et al. . |
| 4,725,121 | 2/1988 | Priaroggia . |
| 4,725,122 | 2/1988 | Anelli et al. . |
| 4,740,054 | 4/1988 | Becker et al. . |
| 4,752,113 | 6/1988 | Saito et al. . |

(List continued on next page.)

FOREIGN PATENT DOCUMENTS

| | | |
|---|---|---|
| 2158963 | 11/1985 | (GB) . |
| 60-61708 | 9/1985 | (JP) . |
| 63-197907 | 8/1988 | (JP) . |
| 9-189832A * | 7/1997 | (JP) . |
| 1446583 | 12/1988 | (SU) . |

OTHER PUBLICATIONS

"Patent Abstract of SU," Patent No. SU–1446–583, Dec. 1988, "Multicore optical cable—has additional helical holes accommodating optical fibres and linked via seams to helical grooves", MOSC Communic Eng, V07 (Dec. 23, 1988).

"Patent Abstract of Japan," Patent No. 60–61708, (Apr. 4, 1985), Sugawara et al., "Optical Fiber Cable".

"Patent Abstract of Japan," Patent No. 63–197907, (Aug. 16, 1988), Kaino et al., "Optical Transmission Fiber Containing Linear Object For Optical Transmission Fiber Cable And Its Manufacture".

Primary Examiner—Rodney Bovernick
Assistant Examiner—Michael J. Stahl
(74) Attorney, Agent, or Firm—Ware, Fressola, Van Der Sluys & Adolphson LLP

(57) ABSTRACT

A composite cable for conducting electrical and optical signals is disclosed. The composite cable comprises a cable housing having a ribbon slot with an optical fiber ribbon arranged in the ribbon slot. The cable housing also has a tubular opening with a multiplicity of copper pairs arranged therein for conducting electric power through the oval slotted composite copper pair and optic ribbon cable, for providing strength to the cable, and for bending without elastic recovery to shape the cable. The composite cable may also include a removable compression cap for covering the ribbon slot.

17 Claims, 4 Drawing Sheets

U.S. PATENT DOCUMENTS

| | | |
|---|---|---|
| 4,767,184 | 8/1988 | Ogasawara et al. . |
| 4,770,489 | 9/1988 | Saito et al. . |
| 4,772,089 | 9/1988 | Ide et al. . |
| 4,781,434 | 11/1988 | Kitagawa et al. . |
| 4,784,461 | 11/1988 | Abe et al. . |
| 4,784,462 | 11/1988 | Priaroggia . |
| 4,786,138 | 11/1988 | Buckley . |
| 4,787,705 * | 11/1988 | Shinmoto et al. .................... 385/104 |
| 4,793,686 | 12/1988 | Saito . |
| 4,802,732 | 2/1989 | Fukuma et al. . |
| 4,804,245 | 2/1989 | Katayose et al. . |
| 4,807,962 | 2/1989 | Arroyo et al. . |
| 4,820,014 | 4/1989 | Nishimura et al. . |
| 4,826,279 | 5/1989 | Nishimura et al. . |
| 4,830,459 | 5/1989 | Chicken et al. . |
| 4,840,453 | 6/1989 | Kitayama . |
| 4,842,366 | 6/1989 | Sawada et al. . |
| 4,859,025 | 8/1989 | Houghton . |
| 4,902,097 | 2/1990 | Worthington et al. . |
| 4,915,490 * | 4/1990 | Ramsay et al. ...................... 385/100 |
| 4,944,570 | 7/1990 | Oglesby et al. . |
| 4,953,942 | 9/1990 | Sasaki . |
| 4,960,318 | 10/1990 | Nilsson et al. . |
| 4,964,691 | 10/1990 | Nelson et al. . |
| 4,975,232 | 12/1990 | Hattori et al. . |
| 4,983,013 | 1/1991 | Dotzer et al. . |
| 4,997,257 | 3/1991 | Spedding . |
| 5,013,126 | 5/1991 | Hattori et al. . |
| 5,039,197 | 8/1991 | Rawlyk . |
| 5,050,960 | 9/1991 | Sutehall . |
| 5,067,791 | 11/1991 | Nishiyama . |
| 5,071,221 | 12/1991 | Fujitani et al. . |
| 5,082,380 | 1/1992 | Sutehall et al. . |
| 5,087,110 | 2/1992 | Inagaki et al. . |
| 5,126,167 | 6/1992 | Matsuno et al. . |
| 5,136,673 | 8/1992 | Yoshizawa et al. . |
| 5,177,809 | 1/1993 | Zeidler . |
| 5,179,611 | 1/1993 | Umeda et al. . |
| 5,188,883 | 2/1993 | Rawlyk . |
| 5,193,134 | 3/1993 | Pizzorno et al. . |
| 5,199,094 | 3/1993 | Schneider . |
| 5,202,945 | 4/1993 | Foertsch . |
| 5,212,756 | 5/1993 | Eoll . |
| 5,218,659 | 6/1993 | Schneider . |
| 5,222,177 | 6/1993 | Chu et al. . |
| 5,222,178 | 6/1993 | Betker et al. . |
| 5,224,190 | 6/1993 | Chu et al. . |
| 5,233,678 | 8/1993 | Katurashima et al. . |
| 5,249,249 | 9/1993 | Eoll et al. . |
| 5,274,725 | 12/1993 | Bottoms, Jr. et al. . |
| 5,289,556 | 2/1994 | Rawlyk et al. . |
| 5,293,443 | 3/1994 | Eoll et al. . |
| 5,319,730 * | 6/1994 | Rasanen et al. ...................... 385/114 |
| 5,377,290 | 12/1994 | Ohta et al. . |
| 5,380,472 | 1/1995 | Schneider . |
| 5,386,489 * | 1/1995 | Stokes ................................... 385/100 |
| 5,408,562 | 4/1995 | Yoshizawa et al. . |
| 5,435,944 | 7/1995 | Shackleton . |
| 5,448,670 * | 9/1995 | Blew et al. .......................... 385/112 |
| 5,495,546 | 2/1996 | Bottoms, Jr. et al. . |
| 5,517,591 | 5/1996 | Wagman et al. . |
| 5,542,020 | 7/1996 | Horska . |
| 5,561,730 | 10/1996 | Lochkovic et al. . |
| 5,668,912 * | 9/1997 | Keller ................................... 385/100 |
| 5,982,966 * | 11/1999 | Bonicel ................................ 385/100 |

* cited by examiner

```
OPTICAL FIBER RIBBON
             AREA       E        α         AEα         AE
  GLASS      0.024    71734   2.40E-06   0.004132    1721.616
  PRIMARY    0.038     1.03   1.00E-04   3.91E-06     0.03914
  SECONDARY  0.038      690   1.00E-04   0.002622    26.22
  RIBBON MATRIX 0.03     69   1.00E-04   0.000207     2.07

SUM                                    0.006965  1749.945
  ALPHA EFF                    3.98E-06
  CONTRACTION FROM 23C TO -40C    0.0251%
```

```
COPPER PAIRS
             AREA       E        α         AEα         AE
  CU         0.32    103000   1.64E-05   0.540544    32960
  INSULATION 0.95      1896   1.30E-04   0.234156     1801.2

SUM                                    0.7747    34761.2
  ALPHA EFF                    2.23E-05
  CONTRACTION FROM 23C TO -40C    0.1404%
```

```
HOUSING, CAP, JACKET
  # PAIRS                6
  HOUSING ID          3.46        ASSUMES WALL OF .5 mm
  HOUSING OD          4.46        ASSUMES WALL OF .75 mm
             AREA       E        α         AEα         AE
  HOUSING + CAP 9.34    1300   1.80E-04   2.185605   12142.25
  JACKET       20.71    1300   1.80E-04   4.845959   26921.99

SUM                                     7.031565  39064.25
  ALPHA EFF                    0.00018
  CONTRACTION FROM 23C TO -40C    1.1340%
```

```
STRUCTURE - RIBBONS

SUM AEα              11.67976
  SUM AE              247631.4
  α EFF                 4.72E-05
  CONTRACTION 23C TO -40C   0.30%
```

FIG.6

SLOTTED COMPOSITE CABLE HAVING A CABLE HOUSING WITH A TUBULAR OPENING FOR COPPER PAIRS AND A SLOT FOR AN OPTICAL FIBER

BACKGROUND OF THE INVENTION

1. Field of the Invention

The present invention relates generally to cables that provide both optical and electric signals in the same cable.

2. Discussion of Related Art

Composite cables having copper pairs for conducting electricity and optical fibers for conducting light are known in the art.

FIG. 1 shows one such prior art composite cable generally indicated as 10, having an oversheath 12 wrapped around a fiber cable generally indicated as 20 and a copper cable generally indicated as 40. The oversheath 12 has ripcords 14. The fiber cable 20 has a jacket 22, a ripcord 24, flexline 26, a buffer tube 28, optical fiber 30 and filling compound 32. The copper cable 40 has a jacket 42, polyethylene 44, tape 46, and copper pairs generally indicated as 48.

U.S. Pat. Nos. 5,050,960 and 5,082,380 show and describe an optical fiber cable construction having a non-electrically conductive rigid rod or core made of glass reinforced resin by a pultrusion or similar process, a binder, and an extruded sheath. The non-electrically conductive rigid rod or core has a fiber slot, a fiber arranged therein, and a cap for the fiber slot. The slot has convexly radiused edges, and the cap has concavely radiused edges for mating with the convexly radiused edges of the cap.

U.S. Pat. No. 4,110,001 shows and describes an optical fiber cable construction having a plastic core, a central steel strength member arranged therein, a core wrap surrounding the plastic core, metal tape around the core wrap, steel armor around the metal tape, and an outer jacket around the steel armor. The plastic core has a fiber channel for receiving optical fiber, and a copper pair channel for receiving copper pairs.

Some shortcomings of the prior art composite cable include: (1) the stranded fiber optic cable in FIG. 1 is large and requires additional material; (2) the cables do not optimize requirements of a fiber optic cable material versus the typical concerns of shrinkage at cold temperatures in a range of −40 to −50 degrees Celsius; (3) the steel central strength member or the pultruded glass reinforced plastic (GRP) strength member in the prior art cables is not capable of being shaped by bending without elastic recovery; and (4) when bent beyond elastic recovery, the steel central strength member buckles, and the pultruded strength member fractures or breaks, resulting in the steel being kinked or the GRP no longer being effective as a strength member. Failure to meet the restrictions on shrinkage results in attenuation of the signal carried by the optical fibers.

SUMMARY OF THE INVENTION

The present invention provides a composite cable for providing electrical and optical signals, having a cable housing, one or more optical fibers, and malleable conductive copper pairs. The cable housing has a fiber ribbon slot and a tubular opening therein. The one or more optical fibers are arranged in the fiber ribbon slot, for providing the optical signals through the composite cable. The malleable conductive copper pairs are arranged in the tubular opening and provide the electrical signals through the composite cable, provide central strength to the composite cable, and permit bending without elastic recovery to shape the composite cable.

The composite cable may have a removable compression cap for covering the ribbon slot. The compression cap and the cable housing together define a generally oval exterior surface when the compression cap is assembled on the cable housing. The cable housing and the compression cap are dimensioned so as to provide a pry slot for receiving a screwdriver for prying the compression cap free of the cable housing. The pry slot is defined by a cable housing-surface and a cap-surface, the cable housing-surface and the cap-surface being opposed to each other and separated by a distance sufficient to permit the blade of a screwdriver to fit therebetween when the compression cap is assembled on the cable housing.

One important advantage of the present invention is that it provides a very versatile cable that is easily accessed, less costly to manufacture, and more easily handled and installed because it is smaller and lighter than composite cables known in the prior art. The groups of copper pairs also are more elastic and do not buckle, kink, fracture or break when subjected to typical bending demands during installation or reentry and installation of the composite cable, and allow the cable to be wrapped in a small coil and stay coiled (i.e. not elastically spring back and straighten out).

Moreover, the present invention results in a reduction in material and more compact composite cable when compared with other composite cable designs. The use of copper pairs as a central strength member replacing glass reinforced or steel rods reduces the overall amount of plastics required, in turn reducing the resulting shrinkage forces of plastics at cold temperatures. The use of copper pairs provides the desired tensile strength for the composite cable. The copper pairs may be used for transmitting data, voice or power.

Moreover still, the oval shape of the composite cable generates rotation during crush load, resulting in the copper pairs that are tightly packed to absorb the crush load, while loosely packed optical fiber or fiber ribbon are not subject to crush load. The copper pairs have less elastic recovery than the glass reinforced or steel rods, thus allowing the composite cable to be routed or fitted to a contour shape best utilizing available space, which reduces the amount of composite cable used during installation and the cost for installing the same.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, not drawn to scale, in which:

FIG. 6 is an Excel spreadsheet of a design for a composite cable using the present invention that meets a cable contraction requirement in a temperature range of 23 to −40 degrees Celsius.

DETAILED DESCRIPTION OF THE INVENTION

The Composite Cable 100

Figure 1:
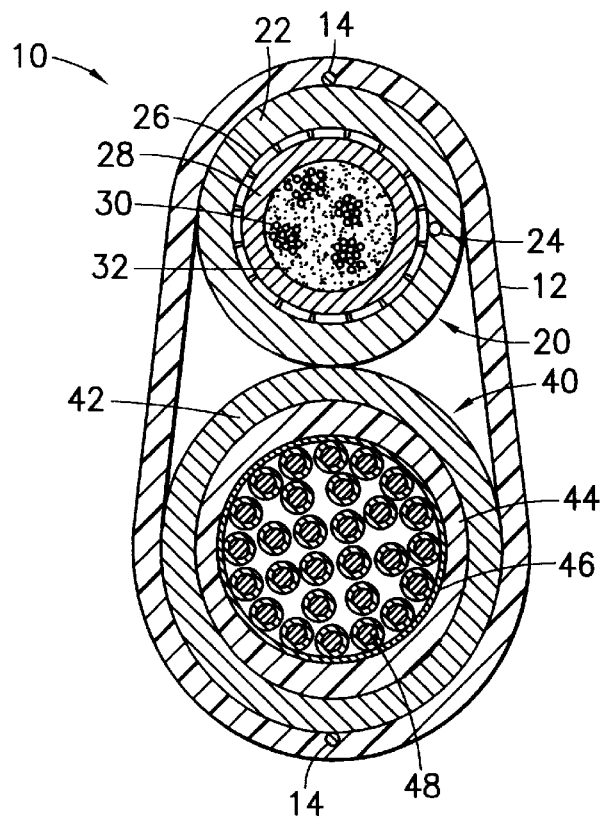
FIG. 1 is a diagram of a cross sectional view of a prior art composite cable.
Figure 2:
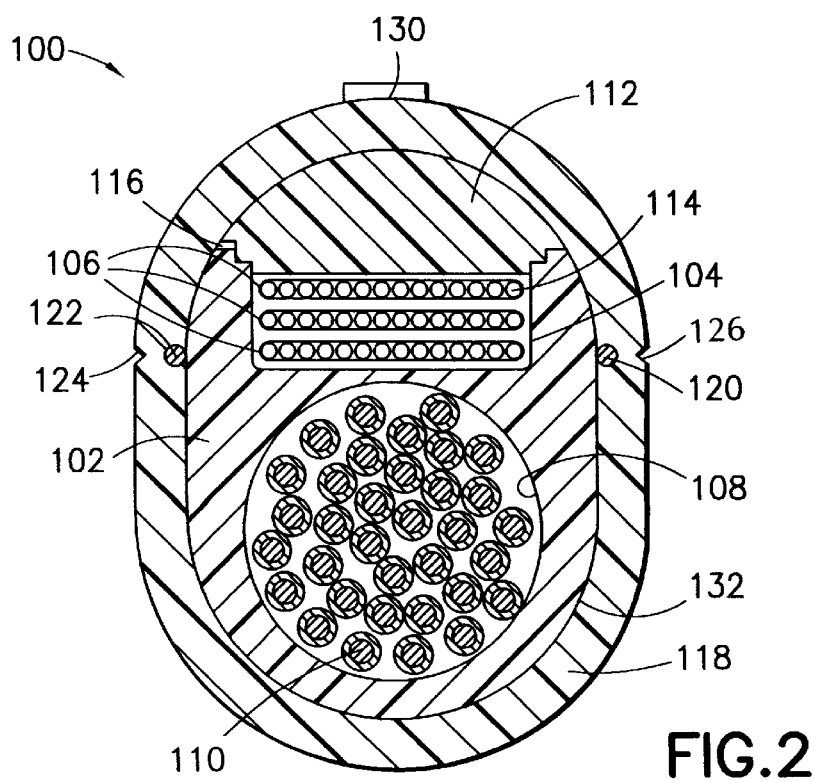
FIG. 2 is a diagram of a cross sectional view of a composite cable according to the present invention.

FIG. 2 shows a composite cable 100 of the present invention that has a cable housing 102 having a ribbon slot 104 with optical ribbons 106 arranged therein, and having a tubular opening 108 with malleable conductive copper pairs generally indicated as 110 arranged in the tubular opening 108. The optical ribbons 106 are stacked in the ribbon slot 104 and provide an optical signal through the composite cable 100. The malleable conductive copper pairs 110 provide the electrical signals through the composite cable, provide central strength to the composite cable, and bend without elastic recovery to shape the composite cable 100.

The composite cable 100 also has a removable compression cap 112 for removably covering the ribbon slot 104. The optical ribbons 106 have optical fibers generally indicated as 114. The ribbon slot 104 is generally rectangular, although the scope of the invention is not intended to be limited to any particular shape. The composite cable 100 has a pry slot 116 between the cable housing 102 and the removable cap 112 for receiving a blade (not shown) of a screwdriver (not shown). The composite cable 100 has a protective jacket 118 with ripcords 120, 122 and with longitudinal V-shaped grooves 124, 126. The ripcords 120, 122 are for splitting the protective jacket 118. The longitudinal V-shaped grooves 124, 126 may be positioned on the protective jacket 118 in order to correspond with the location of the ribbon slot 104. The protective jacket 118 may be made from polyethylene or other suitable material, and has indicia 130 marked thereon for indicating which side contains copper or fiber. As shown, the cable housing 102 and the removable cap 112 form a smooth oval exterior 132 when coupled together. The oval shape facilitates cable rotation during a load so the copper pairs absorb as much of the load as possible so the optical fiber does not crush. It should be noted that other shapes besides oval may be used.

Figure 3:
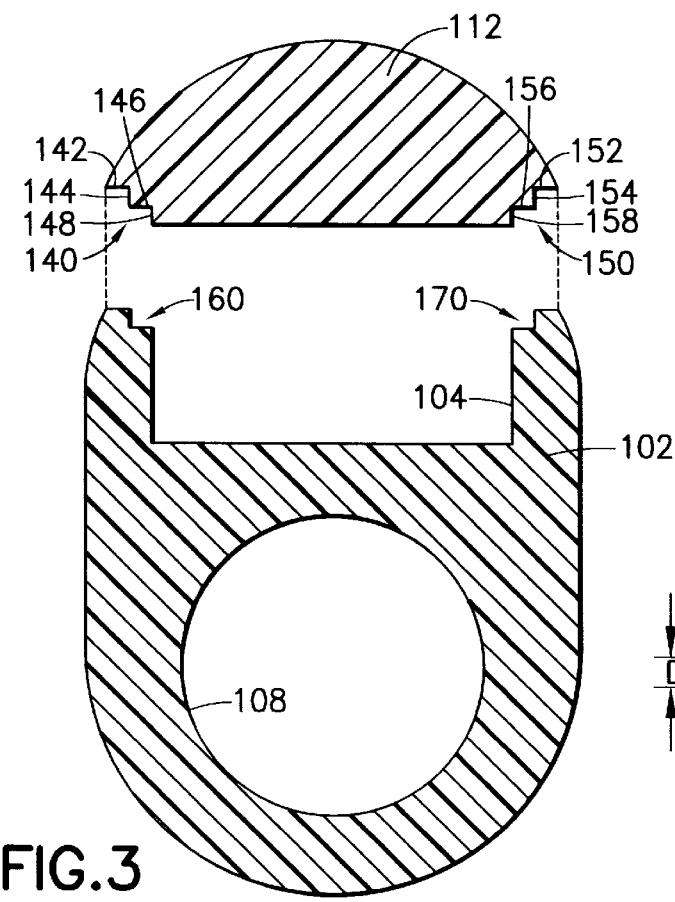
FIG. 3 is a diagram of a cross sectional view of the compression cap showing the removable cap separated from the cable housing.
Figure 4:
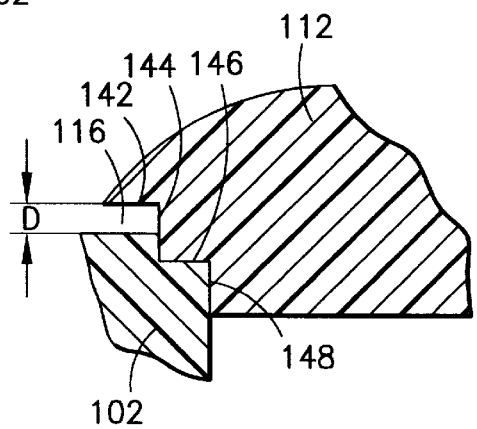
FIG. 4 is a diagram of a partial cross sectional view of a portion of the cable housing and compression cap showing the pry slot for prying the compression cap free of the cable housing.

FIGS. 3 and 4 show the compression cap 112 removed from the cable housing 102. As shown, the compression cap 112 has a first stepped cap surface generally indicated as 140 and a second stepped cap surface generally indicated as 150. The first and second stepped cap surfaces 140, 150 each resemble two steps of a staircase. The first stepped cap surface 140 includes a first horizontal surface 142, a first vertical surface 144, a second horizontal surface 146, and a second vertical surface 148. The second stepped cap surface 150 includes a first horizontal surface 152, a first vertical surface 154, a second horizontal surface 156, and a second vertical surface 158.

The cable housing 102 has a first mating stepped surface 160 and a second mating stepped surface 170 for engaging the first and second stepped cap surfaces 140, 150 respectively, of the compression cap 112. The cable housing 102 may be made of polypropylene, polyethylene or glass reinforced plastic. Similarly, the compression cap 112 may be made of one of these same three materials and is preferably made from the same material as the cable housing 102. It is noted, however, that if the cable housing 102 is made of a material which is softer than the material of the compression cap 112, the cable housing 36 may not need to have the mating stepped surfaces 160, 170. Instead, the first and second stepped cap surfaces 140, 150 will be forceably imbedded in the material of the cable housing 102.

The vertical surfaces 144, 148, 154, 158 of the first and second stepped cap surfaces 140, 150 permit the compression cap 112 to be easily positioned and frictionally engaged with respect to the mating stepped surfaces 160, 170 of the cable housing 102. It should be apparent to those skilled in the art that the first and second stepped cap surfaces 140, 150 may be formed as a single step, instead of two steps.

FIG. 4 shows that the first horizontal surface 142 of the compression cap 112 is separated by a distance D from the cable housing 102. The distance D is dimensioned sufficient to define the pry slot 116 for inserting a screwdriver blade (not shown) therein. When the screwdriver blade (not shown) is inserted into the pry slot 116, the screwdriver (not shown) can be used to pry the compression cap 112 free of the cable housing 102 in order to expose the ribbon slot 104.

The ribbon slot 104 may have a gel or water-swellable powder disposed therein to prevent water from damaging the optical fiber ribbons 106.

The composite cable 100 of the present invention has several advantages over the prior art composite cables. First, the composite cable 100 of the present invention is easily designed and manufactured to meet the requirements of an optical fiber cable, and in particular meets the requirements on contraction in the temperature range from −40° to −50° Celsius, as described below. Furthermore, the composite cable 100 of the present invention does not have a steel strength member or buffer tubes associated with the optical fibers and copper pairs; therefore, the present invention is smaller, lighter and less costly than the prior art composite cables having such strength members and buffer tubes. Finally, the composite cable 100 of the present invention is easily shaped by bending without elastic recovery and suitable for many different applications.

Figure 5:
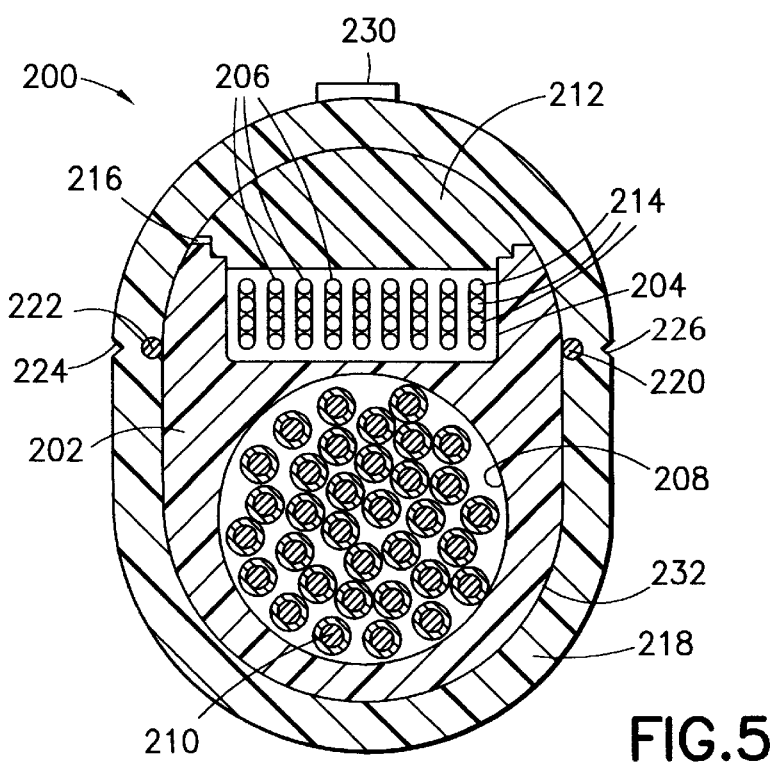
FIG. 5 is a diagram of a cross sectional view of another embodiment of a composite cable according to the present invention.

The Composite Cable 200 in FIG. 5

FIG. 5 shows a composite cable 200, which is an alternative embodiment of the present invention. The reference numerals used to describe the composite cable 200 are substantially similar to those used to describe the composite cable 100 with the addition of one hundred (i.e. 100).

The composite cable 200 has a cable housing 202 having a ribbon slot 204 with optical ribbons 206 arranged therein, and has a tubular opening 208 with copper pairs generally indicated as 210 arranged in the tubular opening 208. The ends of the optical ribbons 206 rest against a bottom surface of the ribbon slot 204. (Compare to the ribbons 106 in FIG. 2.) As shown, the composite cable 200 also has a removable compression cap 212 for removably covering the ribbon slot 204. The optical ribbons 206 have optical fiber ribbons generally indicated as 214. As shown, the ribbon slot 204 is rectangular, although the scope of the invention is not intended to be limited to any particular shape. The composite cable 200 has a pry slot 216 between the cable housing 202 and the removable cap 212 for receiving a blade of a screwdriver (not shown). The composite cable 200 has a protective jacket 218 with ripcords 220, 222 and with V-shaped grooves 224, 226. The protective jacket 218 has indicia 230 marked thereon for indicating which side contains copper or fiber. As shown, the cable housing 202 and the removable cap 212 form a smooth oval exterior 232 when coupled together.

The Cold Temperature Test and Excel Spreadsheet

As discussed above, the present invention enables a composite cable to be designed that meets the industry standard for cold temperature testing requirements. In order to design such a composite cable, one can approximate an effective thermal coefficient of expansion and contraction by an Equation (1), as follows:

$$\alpha_{eff} = (\Sigma A_i E_i \alpha_i)/(\Sigma A_i E_i), \quad \text{(Equation (1))}$$

where the parameter $\alpha_{eff}$ is the effective coefficient of expansion and contraction, the parameter A is an area of material in the cable, the parameter E is a modulus of the material, and the parameter $\alpha$ is a coefficient of thermal expansion and contraction. In Equation (1), the parameters $A_i E_i$ represent a weighting function used to determine the effective coefficient of expansion and contraction of the composite cable. The target is to design the composite cable having a structural contraction of about 0.30% to meet the industry standard.

FIG. 6 shows an Excel spreadsheet for a composite cable having optical fiber ribbon, six copper pairs with copper and insulation, a cable housing with an inner diameter (ID) and outer diameter (OD), a cap and a jacket. It has been found through computer modelling that the use of fewer than six copper pairs undesirably alters the need for the cable housing, in effect requiring too much material, which increases the size the size.

In this example, a copper pair has insulation wrapping with a diameter of 1.27 millimeters, and copper therein with a diameter of 0.635 millimeters. A fiber ribbon has a thickness of 0.30 millimeters and a width of 1.40 millimeters. The housing and cap have an approximate area of $1.5[\pi(OD_2-ID_2)]/4$, where ID=(#pairs*2)$^{1/2}$ and OD=1 millimeter*2+ID (Nb: Assume area for copper equals slot for ribbon or ribbons have approximately 2 times area for contraction movement.) The approximate jacket area=((2+OD+2)*(OD+2))−(2*OD*OD) with a jacket wall of 0.75 millimeters.

Figure 7:
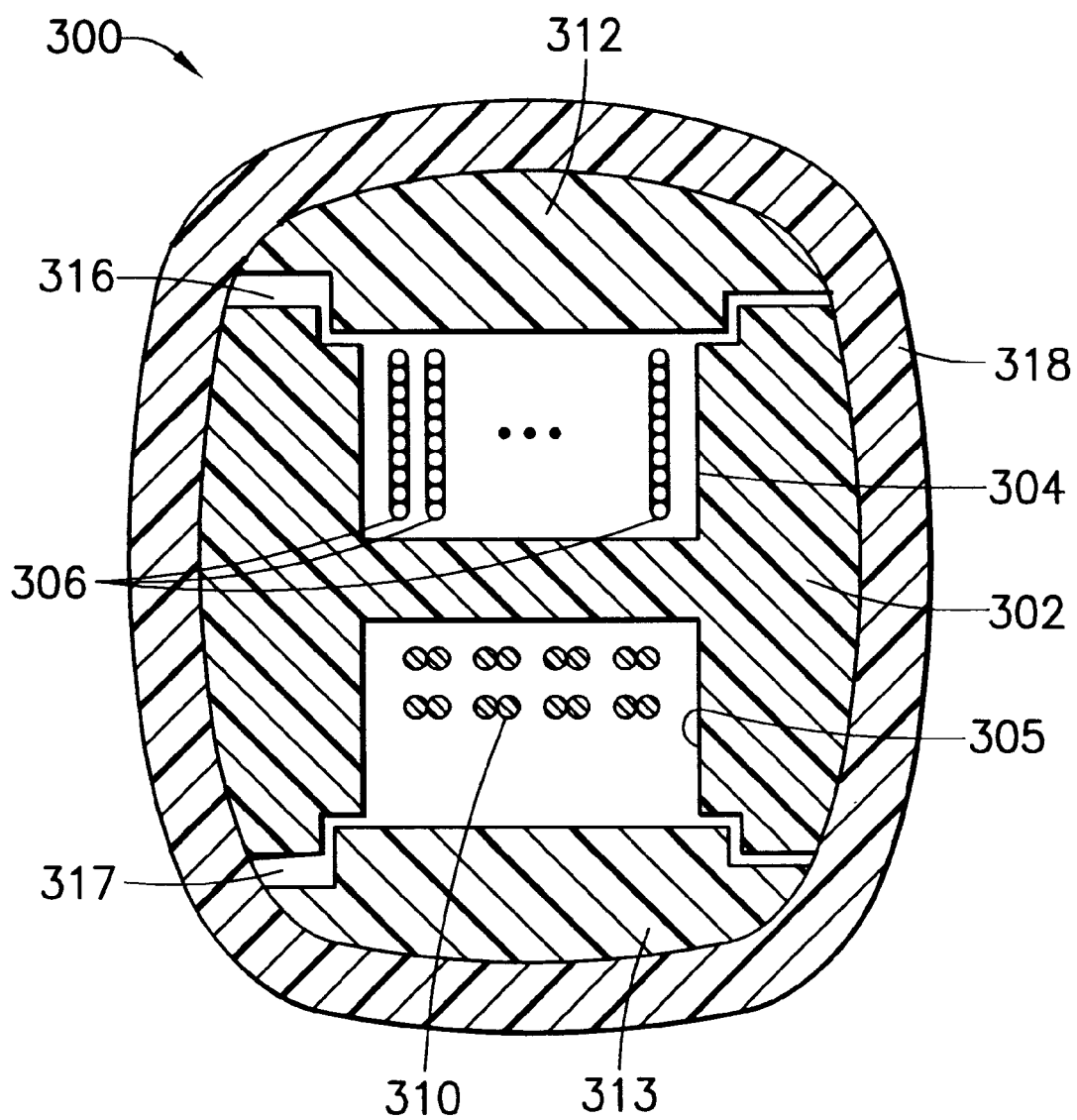
FIG. 7 is a sketch of a cross sectional view of another embodiment of a composite cable according to the present invention.

The Composite Cable 300 in FIG. 7

FIG. 7 shows a composite cable 300, which is an alternative embodiment of the present invention. The reference numerals used to describe the composite cable 300 are substantially similar to those used to describe the composite cable 100 with the addition of two hundred (i.e. 200).

The composite cable 300 has an I-beam shaped cable housing 302 having a ribbon slot 304 with optical ribbons 306 arranged therein, and has a copper pairs slot 305 with copper pairs generally indicated as 310 arranged therein. As shown, the composite cable 300 also has two removable compression caps 312, 313 for removably covering the ribbon slot 304 and the copper pairs 310. The composite cable 300 has pry slots 316, 317 between the cable housing 302 and the removable caps 312, 313 for receiving a blade (not shown) of a screwdriver (not shown). The composite cable 300 has a protective jacket 318 and may have ripcords, V-shaped grooves, indicia marked thereon for indicating which side contains copper or fiber, similar to that shown in FIGS. 2 and 5. The cable housing 302 and the removable cap 312, 313 form a smooth oval exterior when coupled together. The I-beam construction provides excellent crush resistance.

Although the present invention has been described with respect to one or more particular embodiments of the apparatus, it will be understood that other embodiments of the present invention may be made without departing from the spirit and scope of the present invention. Hence, the present invention is deemed limited only by the appended claims and the reasonable interpretation thereof.

What is claimed is:

1. A combined fiber and copper power or communication cable for transmitting data, voice and power signals, comprising:

a cable housing having a ribbon slot on one half of the cable housing and a tubular opening on another half of the cable housing together forming an offset cable design;

an optical fiber ribbon cable arranged in the ribbon slot, for providing optical signals through the combined fiber and copper power or communication cable; and a multiplicity of malleable conductive copper pairs arranged in the tubular opening, the malleable conductive copper pairs being accessible through the tubular opening without disturbing the optical fiber ribbon cable arranged in the ribbon slot, for providing power and communication signals through the combined fiber and copper power or communication cable, for providing strength to the combined fiber and copper power or communication cable, and for bending without elastic recovery to shape the combined fiber and copper power or communication cable.

2. A combined fiber and copper power or communication cable according to claim 1, wherein the composite cable further comprises a removable compression cap.

3. A combined fiber and copper power or communication cable according to claim 2, wherein the removable compression cap and the cable housing together define a generally oval exterior surface when coupled together.

4. A combined fiber and copper power or communication cable according to claim 3, wherein the removable compression cap is comprised of substantially the same material as the cable housing.

5. A combined fiber and copper power or communication cable according to claim 1, wherein the cable housing and the removable compression cap are formed so as to define a pry slot for receiving a screwdriver for prying the compression cap free of the cable housing.

6. A combined fiber and copper power or communication cable according to claim 5, wherein the pry slot is defined by a cable housing-surface and a cap-surface, the cable housing-surface and the cap-surface being opposed to each other and separated by a distance sufficient to permit a blade of a screwdriver to fit therebetween when the compression cap is assembled on the cable housing.

7. A combined fiber and copper power or communication cable according to claim 1, wherein the ribbon slot is rectangular.

8. A combined fiber and copper power or communication cable according to claim 1, wherein the cable housing is comprised of a material selected from the group consisting of polypropylene, polyethylene and glass reinforced plastic.

9. A combined fiber and copper power or communication cable according to claim 1, wherein the cable housing is enclosed by a protective jacket.

10. A combined fiber and copper power or communication cable according to claim 9, wherein the protective jacket is comprised of polyethylene.

11. A combined fiber and copper power or communication cable according to claim 9, wherein the protective jacket has one or more longitudinal V-shaped notches for assisting with splitting the protective jacket.

12. A combined fiber and copper power or communication cable according to claim 9, wherein the protective jacket has indicia thereon for locating the ribbon slot.

13. A combined fiber and copper power or communication cable according to claim 9, further comprising a ripcord for splitting the protective jacket.

14. A combined fiber and copper power or communication cable according to claim 9, further comprising two ripcords for splitting the protective jacket to permit removal of at least a portion of the protective jacket.

15. A combined fiber and copper power or communication cable according to claim 1, further comprising a gel disposed within the ribbon slot for preventing water from contacting the optical fiber ribbon cable.

16. A combined fiber and copper power or communication cable according to claim 1, further comprising a coating of swellable powder in the ribbon slot.

17. An oval slotted composite copper pair and optic ribbon cable for providing electrical signals and optical signals, comprising:

an oval inner tubular housing having a fiber ribbon slot on one half of the cable housing and a tubular opening on another half of the cable housing together forming an offset cable design;

an optical fiber ribbon having a plurality of optical fibers arranged in the fiber ribbon slot of the inner tubular housing, for providing an optical signal through the oval slotted composite copper pair and optic ribbon cable; and at least six malleable conductive copper pairs arranged in the tubular opening of the oval inner tubular housing, the at least six malleable conductive copper pairs being accessible through the tubular opening without disturbing the one or more optical fibers arranged in the fiber ribbon slot, for conducting electric power through the oval slotted composite copper pair and optic ribbon cable, for providing strength to the oval slotted composite copper pair and optic ribbon cable, and for bending without elastic recovery to shape the oval slotted composite copper pair and optic ribbon cable;

a compression cap for removably covering the fiber ribbon slot; and an outer protective jacket for enclosing the oval inner tubular housing.

* * * * *

UNITED STATES PATENT AND TRADEMARK OFFICE
CERTIFICATE OF CORRECTION

| | |
|---|---|
| PATENT NO. | : 6,169,834 B1 |
| DATED | : January 2, 2001 |
| INVENTOR(S) | : Keller |

It is certified that error appears in the above-identified patent and that said Letters Patent is hereby corrected as shown below:

Column 6,
Line 39 (Claim 5, line 2) delete "claim 1" and insert -- claim 2 --.

Signed and Sealed this

Twenty-third Day of October, 2001

Attest:

*Attesting Officer*

NICHOLAS P. GODICI
*Acting Director of the United States Patent and Trademark Office*